(12) United States Patent
Nemoto

(10) Patent No.: US 8,794,360 B2
(45) Date of Patent: Aug. 5, 2014

(54) SHUTTER UNIT FOR VEHICLE

(75) Inventor: Hirotomi Nemoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 350 days.

(21) Appl. No.: 13/178,802

(22) Filed: Jul. 8, 2011

(65) Prior Publication Data

US 2012/0022742 A1  Jan. 26, 2012

(30) Foreign Application Priority Data

Jul. 20, 2010 (JP) ................................. 2010-162464

(51) Int. Cl.
*B60K 11/00* (2006.01)
*G06F 7/00* (2006.01)
*G06F 17/00* (2006.01)
*B60K 11/08* (2006.01)

(52) U.S. Cl.
CPC ................................. *B60K 11/085* (2013.01)
USPC .............................. 180/68.1; 701/36; 701/49

(58) Field of Classification Search
CPC ...... B60K 11/08; B60K 15/04; B60K 15/077;
G06K 9/00; G06K 19/06; G06K 9/46; F01P 7/10; F01P 7/046; F01P 7/048
USPC ....... 701/49, 36; 180/68.1; 68/12.16; 165/43; 165/204; 454/75; 396/452; 310/214, 68; 237/12.3
See application file for complete search history.

(56) References Cited

U.S. PATENT DOCUMENTS

| | | | | |
|---|---|---|---|---|
| 4,871,011 A * | 10/1989 | Takahashi et al. | ............ | 165/204 |
| 5,146,125 A * | 9/1992 | Kerlin | ........................ | 310/68 R |
| 5,653,386 A * | 8/1997 | Hennessee et al. | ...... | 237/12.3 B |
| 5,808,392 A * | 9/1998 | Sakai et al. | .................... | 310/214 |
| 6,382,847 B1 * | 5/2002 | Takada | .......................... | 396/452 |
| 8,091,668 B2 * | 1/2012 | Amano et al. | ............... | 180/68.1 |
| 8,311,708 B2 * | 11/2012 | Kerns | .............................. | 701/49 |
| 2005/0095971 A1 * | 5/2005 | Urbank et al. | .................. | 454/75 |
| 2006/0102399 A1 * | 5/2006 | Guilfoyle et al. | ............ | 180/68.1 |
| 2008/0283215 A1 * | 11/2008 | Saida et al. | ...................... | 165/43 |
| 2009/0050385 A1 * | 2/2009 | Guilfoyle et al. | ............ | 180/68.1 |
| 2009/0056385 A1 * | 3/2009 | Maekawa | ..................... | 68/12.16 |
| 2010/0147611 A1 * | 6/2010 | Amano et al. | ............... | 180/68.1 |
| 2010/0243352 A1 * | 9/2010 | Watanabe et al. | ............ | 180/68.1 |
| 2011/0137530 A1 * | 6/2011 | Kerns | .............................. | 701/49 |
| 2011/0246023 A1 * | 10/2011 | Lockwood et al. | ............ | 701/36 |

FOREIGN PATENT DOCUMENTS

DE  102006054970 A1  5/2008
JP       59-114412       8/1984

* cited by examiner

*Primary Examiner* — Calvin Cheung
*Assistant Examiner* — Luis A Martinez Borrero
(74) *Attorney, Agent, or Firm* — Rankin, Hill & Clark LLP

(57) ABSTRACT

A shutter unit for a vehicle, capable of properly determining failure of a shutter without using a sensor which directly detects a position of the shutter. The shutter unit includes a return spring for returning the shutter to a predetermined initial position by urging the shutter, and a rotating machine configured to be capable of converting input motive power to electrical power and input electrical power to motive power by electromagnetic induction action. The rotating machine drives the shutter by the motive power obtained by conversion. The shutter unit executes return control that stops supply of electric power to the rotating machine to return the shutter to the initial position by urging of the shutter by the return spring, and determines failure of the shutter based on a rotating machine induced voltage of the rotating machine, detected during execution of the return control.

17 Claims, 7 Drawing Sheets

F I G. 2
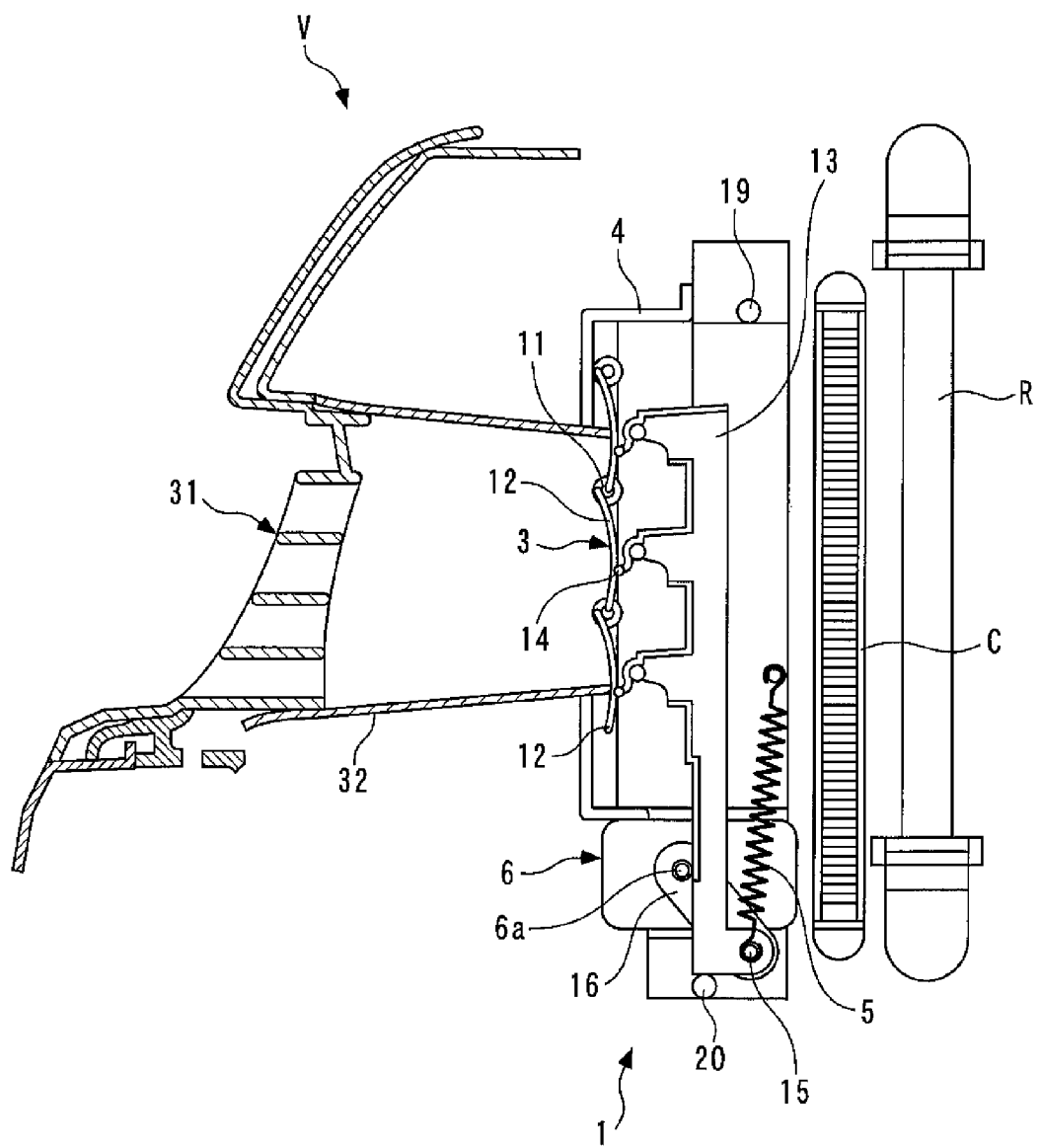

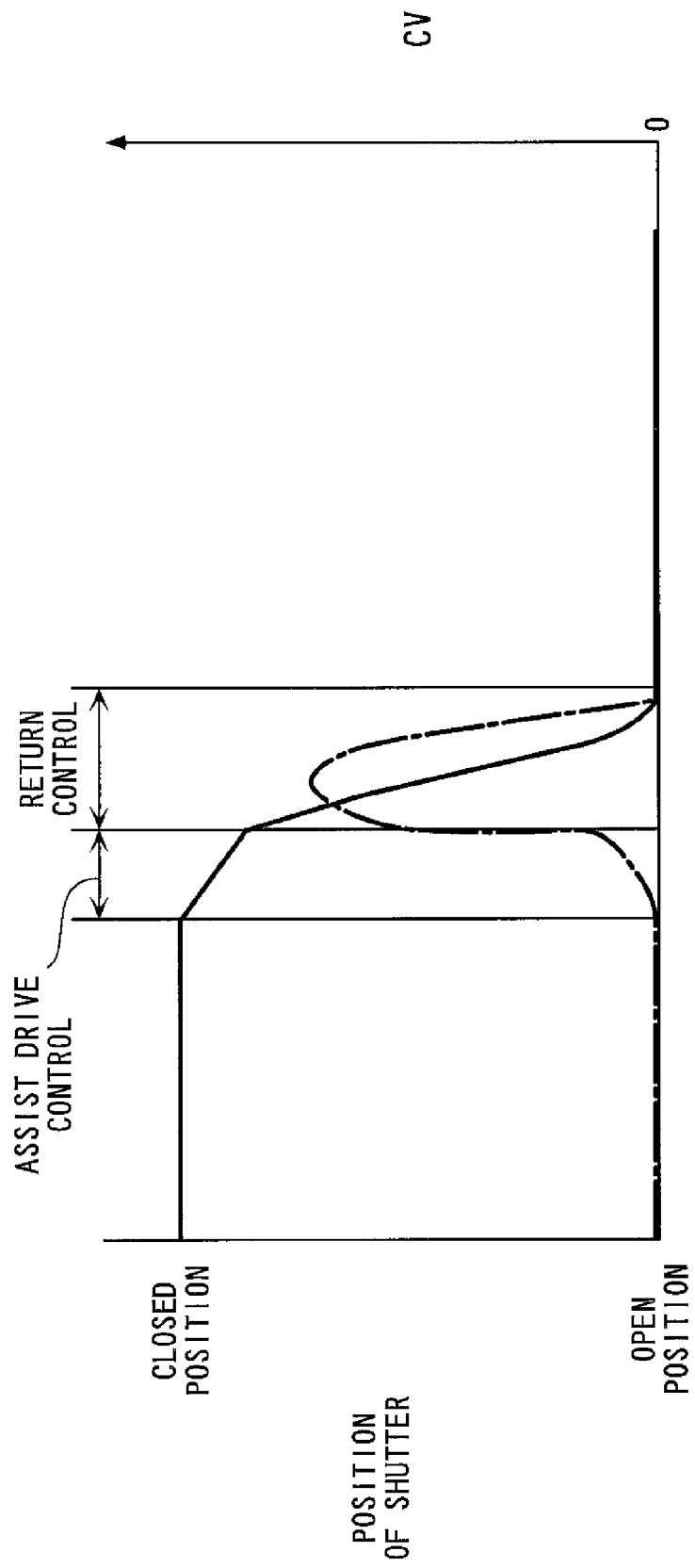

SHUTTER UNIT FOR VEHICLE

BACKGROUND OF THE INVENTION

1. Field of the Invention

The present invention relates to a shutter unit for a vehicle, provided on a front part of a vehicle, for adjusting an amount of outside air introduced into the front part.

2. Description of the Related Art

Conventionally, a shutter unit for a vehicle of this kind has been proposed in Japanese Laid-Open Utility Model Publication (Kokai) No. S59-114412. This shutter unit is for adjusting a flow rate of outside air flowing through a radiator which cools an internal combustion engine of a vehicle, and is disposed in a front grill of the vehicle. Further, the shutter unit comprises a shutter formed by a plurality of pivotally movable blades and driving means. The driving means opens and closes the shutter, to thereby adjust the flow rate of outside air flowing through the radiator. Further, the shutter is provided with a spring for urging the shutter toward an open position. In this conventional shutter unit, even when the driving means is faulty, the spring returns the shutter to the open position to thereby ensure cooling capacity of the radiator.

However, the shutter of this kind is provided on the front part of the vehicle and is exposed to outside air, and hence particularly, foreign matter, such as dust, is likely to attach to the shutter. For this reason, in the conventional shutter unit, there is a fear that the shutter is stuck by attached foreign matter, and as a result, the shutter cannot be moved even by urging of the spring, which makes the shutter faulty. However, in the conventional shutter unit, the shutter is merely provided with the spring in order to compensate for a failure of the driving means, and hence it is impossible to determine such a failure of the shutter as described above.

SUMMARY OF THE INVENTION

It is an object of the present invention to provide a shutter unit for a vehicle, which is capable of properly determining failure of a shutter without using a sensor which directly detects a position of the shutter.

To attain the above object, the present invention provides a shutter unit for a vehicle, comprising a shutter that is provided in a front part of the vehicle, and is opened and closed in order to adjust an amount of outside air introduced into the front part, urging means for returning the shutter to a predetermined initial position by urging the shutter, a rotating machine configured to be capable of converting input motive power to electrical power, and converting input electrical power to motive power, by electromagnetic induction action, the rotating machine driving the shutter by the motive power obtained by conversion, induced voltage-detecting means for detecting a rotating machine induced voltage which is an induced voltage of the rotating machine, control means for executing return control for stopping supply of electric power to the rotating machine in order to cause the shutter to return to the initial position by urging of the urging means, and failure-determining means for determining failure of the shutter based on the rotating machine induced voltage detected during execution of the return control by the control means.

With the configuration of the shutter unit, the rotating machine opens and closes the shutter disposed in the front part of the vehicle by driving the same, and the urging means causes the shutter to return to the predetermined initial position by urging the same. Further, the rotating machine induced voltage which is induced voltage of the rotating machine is detected by the induced voltage-detecting means. Further, return control that stops supply of electric power to the rotating machine is executed by the control means in order to return the shutter to the initial position by urging of the urging means.

In a normal time when the shutter is not faulty, during execution of the above-mentioned return control, the shutter is moved toward the initial position by urging of the urging means, and in accordance with this, motive power is transmitted from the shutter to the rotating machine. In this case, since the rotating machine is configured to convert input motive power to electric power by electromagnetic induction action, during execution of the return control, motive power is transmitted from the shutter as above to thereby generate rotating machine induced voltage. On the other hand, when the shutter is faulty, since the shutter is hardly moved by urging of the urging means, and is in a stuck state, motive power is hardly transmitted from the shutter to the rotating machine during execution of the return control, and as a result, the rotating machine induced voltage is hardly generated.

With the configuration of the shutter unit, the failure-determining means determines failure of the shutter based on the rotating machine induced voltage detected during execution of the return control, and hence it is possible to properly carry out the failure determination. Further, since the induced voltage-detecting means is normally used for controlling the rotating machine, only by using such induced voltage-detecting means and detecting the rotating machine induced voltage, a need of a dedicated sensor for directly detecting a position of the shutter is eliminated, which makes is possible to simplify the unit and reduce the costs.

Further, as mentioned above, the rotating machine induced voltage is generated when the shutter is normal, but is hardly generated when the shutter is faulty, and hence it is possible to carry out the failure determination without any problem even when the induced voltage-detecting means which is relatively low in detection accuracy is used.

Preferably, in executing the return control from a state where the shutter is held in a predetermined position different from the initial position by being driven by the rotating machine, the control means starts the return control after executing assist drive control for controlling the rotating machine for a predetermined time such that the rotating machine drives the shutter toward the initial position.

When the shutter starts to be moved to the initial position from the state where the shutter is stationary in the predetermined position, the frictional force acting on the shutter is changed from a static frictional force to a dynamic frictional force. This causes unstable changes in motive power transmitted from the shutter to the rotating machine when the shutter starts to be moved to the initial position, and as a result, the generated rotating machine induced voltage becomes unstable. For this reason, if the failure determination is carried out using the rotating machine induced voltage detected at the start of movement of the shutter, there is a high possibility that it is impossible to properly carry out this determination.

With the configuration of this preferred embodiment, in executing the return control when the shutter is held in the predetermined position different from the initial position by being driven by the rotating machine, the assist drive control which controls the rotating machine to drive the shutter toward the initial position is executed, and hence it is possible to immediately change the frictional force acting on the shutter from the static frictional force to the dynamic frictional force. Further, since the return control is started after the assist drive control has been executed for a predetermined time, it is possible to carry out the return control after the frictional force acting on the shutter has completely changed from the static frictional force to the dynamic frictional force. Therefore, it is possible to use the rotating machine induced voltage detected when the motive power transmitted from the shutter to the rotating machine is stable, for the failure determination, and hence it is possible to more properly carry out the failure determination.

Further, since the assist drive control is executed only for a predetermined time before starting the return control, it is possible to positively prevent the shutter from reaching the initial position before determining failure by the assist drive control.

Preferably, the failure-determining means uses the rotating machine induced voltage detected after a predetermined standby time has elapsed after starting of the return control, for determination of failure of the shutter.

Immediately after the return control is started, only a short time period has elapsed after starting to drive the shutter by the urging means, and hence even when the shutter is normal, the rotational speed of the rotating machine which is rotated by the motive power transmitted from the shutter is very low, and similarly, the rotating machine induced voltage is also very low. Therefore, if the determination of failure of the shutter is performed using the rotating machine induced voltage detected immediately after the return control is started, there is a possibility of being incapable of properly performing the determination. According to the configuration of this preferred embodiment, the rotating machine induced voltage detected when the predetermined standby time has elapsed after the return control is started is used for determining failure of the shutter. With this configuration, for the failure determination, it is possible to use the rotating machine induced voltage generated in a state where the rotational speed of the rotating machine has been sufficiently increased by having the shutter driven by the urging means to a certain extent, and hence it is possible to further properly carry out the failure determination.

More preferably, the shutter unit further comprises vehicle speed-detecting means for detecting a speed of the vehicle, and standby time-setting means for setting the predetermined standby time according to the detected vehicle speed.

As mentioned above, the standby time is set as a waiting time from the start of the return control in order to use the rotating machine induced voltage for the failure determination during the return control in the state where the rotational speed of the rotating machine has sufficiently increased. Further, as mentioned above, since the shutter is disposed in the front part of the vehicle, wind pressure caused by traveling wind acts on the shutter during traveling of the vehicle. The motive power transmitted from the shutter to the rotating machine during the return control varies with the influence of the wind pressure, which changes the time required for the rotational speed of the rotating machine to sufficiently increase, and also changes the time required for the shutter to reach the initial position. From the above, assuming that the standby time is set to a fixed predetermined value, even when the standby time has elapsed, there can occur a case where the rotational speed of the rotating machine has not sufficiently increased or a case where the shutter has reached the initial position before the standby time elapses, which makes it impossible to properly determine failure of the shutter.

With the configuration of this preferred embodiment, the standby time is set according to the vehicle speed which has a close correlation with wind pressure caused by traveling wind, and hence it is possible to further properly determine failure of the shutter.

Preferably, the shutter unit further comprises vehicle speed-detecting means for detecting a speed of the vehicle, and the failure-determining means stops determination of failure of the shutter when the detected vehicle speed is higher than a predetermined upper limit value.

As mentioned above, since the shutter is disposed in the front part of the vehicle, wind pressure caused by traveling wind acts on the shutter. Therefore, when wind pressure is very high due to high speed of the vehicle, the influence of the wind pressure on the motive power transmitted from the shutter to the rotating machine is very large, and hence it is impossible to properly carry out the failure determination of the shutter based on the rotating machine induced voltage. With the configuration of this preferred embodiment, the failure determination is stopped when the vehicle speed is higher than the upper limit value, and is executed when the vehicle speed is not higher than the upper limit value, and hence it is possible to carry out the failure determination only in the condition suitable for the failure determination.

Preferably, the shutter unit further comprises a stopper with which the shutter is brought into abutment, for thereby restricting movement of the shutter beyond the initial position, and the control means terminates the return control when the determination of failure of the shutter by the failure-determining means is completed, and controls the rotating machine such that the rotating machine brakes the shutter when the shutter is moved toward the initial position by urging of the urging means.

With the configuration of this preferred embodiment, the shutter is brought into abutment with the stopper, whereby the movement of the shutter beyond the initial position is restricted. Further, when the failure determination of the shutter is completed, the return control is terminated, and the rotating machine is controlled to brake the shutter moving toward the initial position by being urged by the urging means. This makes it possible to reduce the moving speed of the shutter, and hence it is possible to reduce a hitting sound and an impact force caused by hard abutment of the shutter with the stopper, and therefore, it is possible to prevent the shutter and the stopper from being deformed.

Further, the rotating machine is controlled to brake the shutter after the failure determination of the shutter using the rotating machine induced voltage is completed, and hence it is possible to properly carry out the failure determination and at the same time prevent the shutter and so forth from being deformed.

The above and other objects, features, and advantages of the present invention will become more apparent from the following detailed description taken in conjunction with the accompanying drawings.

BRIEF DESCRIPTION OF THE DRAWINGS

FIG. 2 is a cross-sectional view of the shutter unit in a state where the shutter is closed;

FIG. 7 is a timing diagram showing a comparative example of FIG. 6.

DETAILED DESCRIPTION OF PREFERRED EMBODIMENTS

Figure 1:
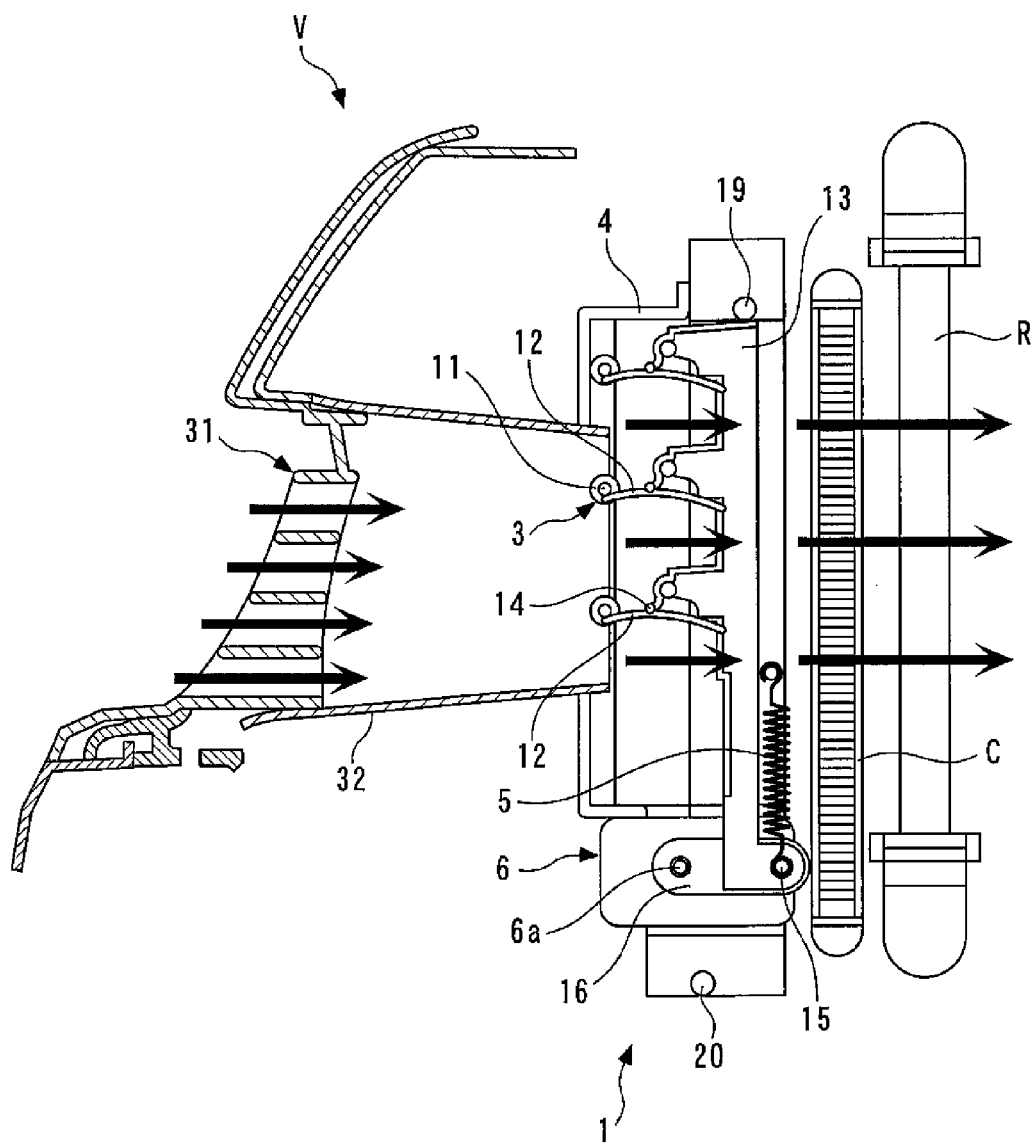
FIG. 1 is a cross-sectional view of a shutter unit of a vehicle according to an embodiment in a state where the shutter is opened.

The invention will now be described in detail with reference to drawings showing a preferred embodiment thereof. A shutter unit 1 shown in FIG. 1 is provided in a front part of a vehicle V together with a grill 31 and a duct 32, and a condenser C and a radiator R are provided at respective locations rearward of the shutter unit 1. During traveling of the vehicle V, outside air is guided to the condenser C and the radiator R by the grill 31 and the duct 32. The condenser C forms a refrigeration cycle for an air conditioner (not shown) of the vehicle V, together with a compressor, an evaporator (neither of which is shown), etc. Further, the radiator R is for cooling an internal combustion engine (not shown) as a power source of the vehicle V.

As shown in FIG. 1, the shutter unit 1 comprises a shutter 3 for adjusting a flow rate of outside air introduced into the condenser C etc., a shutter base 4 which supports the shutter 3, a return spring 5 for returning the shutter 3 to an initial position, and a rotating machine 6 for driving the shutter 3.

The shutter 3 is a normally-open type, and includes a plurality of shafts 11, blades 12 rotatably mounted on the respective shafts 11, and a slide link 13 which links the blades 12 to each other. These shafts 11 are fixed to the shutter base 4, extend in a horizontal direction of the vehicle V, and are arranged in a manner spaced from each other by a predetermined distance in a vertical direction.

Further, each blade 12 is linked to the slide link 13 via a joint 14 which makes each blade 12 pivotally movable with respect to the slide link 13. Further, the slide link 13 extends in the vertical direction, and is connected to a rotating shaft 6a of the rotating machine 6 via a connection pin 15 and an arm link 16. Further, an upper stopper 19 and a lower stopper 20 are mounted to the shutter base 4. The upper and lower stoppers 19 and 20 are disposed at respective locations upward and downward of the slide link 13, and restrict the movement of the shutter 3 including the slide link 13, in a manner described hereinafter. Note that in FIGS. 1 and 2, reference numerals denoting component elements which are provided in plurality, such as the shafts 11 and the blades 12, are partially omitted for the convenience sake.

Further, the return spring 5 is implemented by an extension spring, and has an upper end thereof fixed to the shutter base 4, and a lower end thereof fixed to the slide link 13, respectively. The slide link 13 is urged upward by the return spring 5.

The rotating machine 6 is a brushless DC motor, and includes a stator formed by U-phase, V-phase, and W-phase coils, and so on, and a rotor formed by a magnet and so on (none of which are shown). The rotor is integrally provided with the rotating shaft 6a. Further, the rotating machine 6 is configured to be capable of converting motive power input to the rotating shaft 6a to electric power so as to output the electric power from the stator (electric generation), and converting electric power input to the stator to motive power so as to output the motive power to the rotating shaft 6a, by an electromagnetic inductive action. Further, a battery (not shown) as a power source and an ECU 2, referred to hereinafter, are connected to the rotating machine 6 (see FIG. 3), and electric power input (supplied) from the battery to the stator is controlled by the ECU 2.

In the shutter unit 1 configured as above, when supply of electric power from the battery to the rotating machine 6 is stopped and hence the shutter 3 is not driven by the rotating machine 6, the shutter 3 including the slide link 13 is positioned in an open position shown in FIG. 1 by urging of the return spring 5. This causes the duct 32 to be opened, which allows outside air to be introduced to the condenser C etc. Further, in this state, an upper end of the slide link 13 is brought into abutment with the upper stopper 19. This restricts the movement of the shutter 3 so as to prevent the shutter 3 including the slide link 13 from moving upward beyond the open position, and holds the shutter 3 in the open position.

Further, when the rotating shaft 6a is rotated clockwise from the state illustrated in FIG. 1 by electric power supplied from the battery to the rotating machine 6, in accordance with the pivotal motion of the arm link 16 performed in unison with the rotation of the rotational shaft 6a, the slide link 13 moves downward until the slide link 13 is brought into abutment with the lower stopper 20 against the urging force of the return spring 5. In accordance with the movement of the slide link 13, the blades 12 are each pivotally moved clockwise about the associated shaft 11, and the shutter 3 is positioned in a closed position illustrated in FIG. 2. This causes the duct 32 to be closed, whereby introduction of outside air into the condenser etc. is stopped. Further, in this state, a lower end of the slide link 13 is brought into abutment with the lower stopper 20. This restricts the movement of the shutter 3 so as to prevent the shutter 3 including the slide link 13 from moving downward beyond the closed position, and holds the shutter 3 in the closed position.

Figure 3:
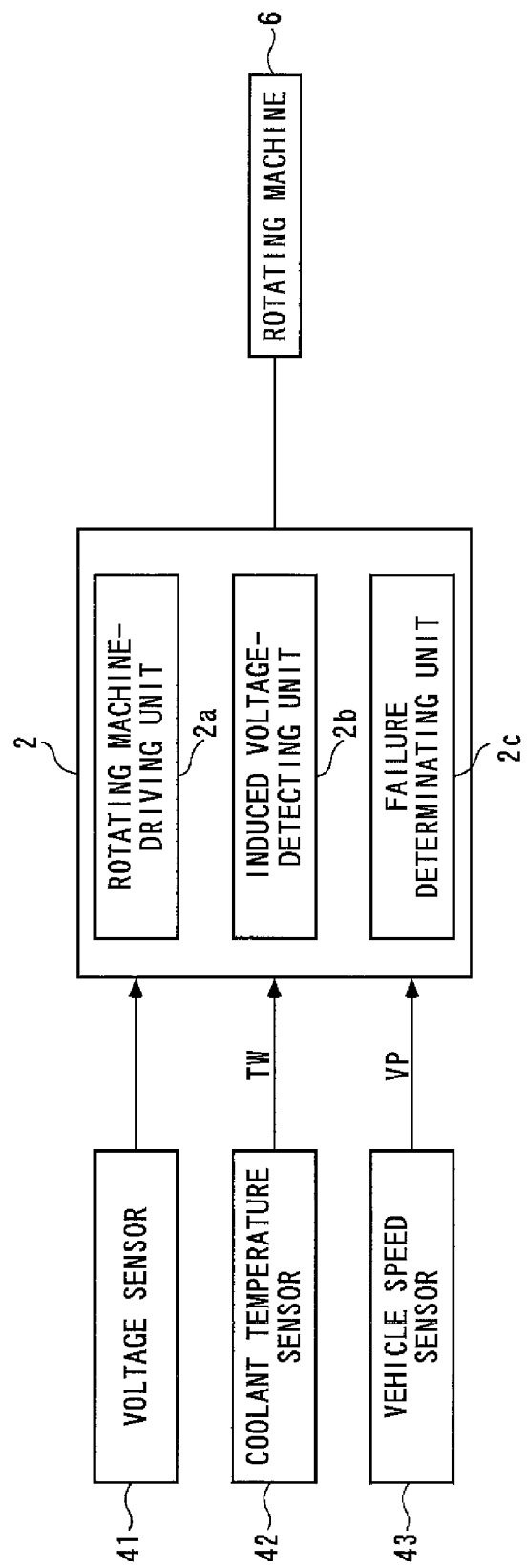
FIG. 3 is a block diagram showing an ECU and so forth included in the shutter unit.

Further, as shown in FIG. 3, a voltage sensor 41, a coolant temperature sensor 42, and a vehicle speed sensor 43 are connected to the ECU 2. The voltage sensor 41 detects voltage at a terminal of the U-phase coil of the rotating machine 6 (hereinafter referred to as the "U-phase terminal voltage"), and delivers a signal indicative of the sensed U-phase terminal voltage to the ECU 2. Further, the coolant temperature sensor 42 detects an engine coolant temperature TW as a temperature of coolant for cooling the above-mentioned engine, and delivers a signal indicative of the sensed engine coolant temperature TW to the ECU 2. Further, the vehicle speed sensor 43 detects a vehicle speed VP which is a traveling speed of the vehicle V, and delivers a signal indicative of the sensed vehicle speed VP to the ECU 2.

The ECU 2 includes a microcomputer comprising a CPU, a RAM, a ROM, and an I/O interface (none of which are specifically shown). Further, the ECU 2 executes various processes according to control programs stored in the ROM based on the detection signals input from the above-mentioned various sensors 41 to 43.

More specifically, the ECU 2 includes a circuit for driving the rotating machine 6, a rotating machine-driving unit 2a, an induced voltage-detecting unit 2b, and a failure determining unit 2c. This circuit is formed e.g. by first to third switching elements connected to the above-mentioned U-phase to W-phase coils of the rotating machine 6, respectively.

The rotating machine-driving unit 2a duty-controls on/off of these switching elements, to thereby control electric power (electric current) supplied to each phase coil. This causes the rotating machine 6 to be driven, whereby the opening/closing operation of the shutter 3 is controlled. In this case, when a predetermined opening condition is satisfied, supply of electric power to the rotating machine 6 is stopped. With this operation, the shutter 3 is held in the open position by urging of the above-mentioned return spring 5. On the other hand, when the opening condition is not satisfied, electric power is supplied to the rotating machine 6. With this operation, the shutter 3 is driven by the rotating machine 6, and then is held in the closed position.

Note that it is determined that the opening condition is satisfied when a plurality of predetermined conditions including a condition that the detected engine coolant temperature TW is higher than a predetermined temperature are satisfied. Further, immediately after the opening condition is satisfied, determination as to a failure of the shutter 3 is executed by the failure determining unit 2c, as described hereinafter, and during execution of this determination, the operation of the rotating machine 6 is controlled not by the rotating machine-driving unit 2a but by the failure determining unit 2c.

Further, the induced voltage-detecting unit 2b detects an induced voltage CV generated in the rotating machine 6 (hereinafter referred to as the "rotating machine induced voltage"). As is clear from the above-mentioned function of the rotating machine 6, in both of a case where the rotating shaft 6a is rotated by supply of electric power and a case where although supply of electric power is stopped, the rotating shaft 6a is rotated by an external force, induced voltage is generated in the U-phase to W-phase coils in accordance with rotation of the rotating shaft 6a. For this reason, the detected U-phase terminal voltage indicates voltage applied to the U-phase coil when an electric current is supplied to the U-phase coil, and indicates induced voltage generated in the U-phase coil when an electric current is not supplied to the U-phase coil. Therefore, the induced voltage-detecting unit 2b detects the rotating machine induced voltage CV based on the detected U-phase terminal voltage. Note that the phrase "when an electric current is not supplied to the U-phase coil" in this case includes not only "when an electric current is not supplied to the whole coils including the V-phase and W-phase coils", but also "when an electric current is supplied to the V-phase coil or the W-phase coil but is not supplied to only the U-phase coil alone".

Further, the rotating machine-driving unit 2a detects a rotational angle position of the rotor with respect to the stator in the rotating machine 6 based on the detected rotating machine induced voltage CV, and duty-controls on/off of the switching elements based on the detected rotational angle position of the rotor. The detection of the rotational angle position of the rotor in this case is performed e.g. by using a method disclosed in Japanese Patent Publication (Kokai) No. 2003-189675 proposed by the present assignee.

Figure 4:
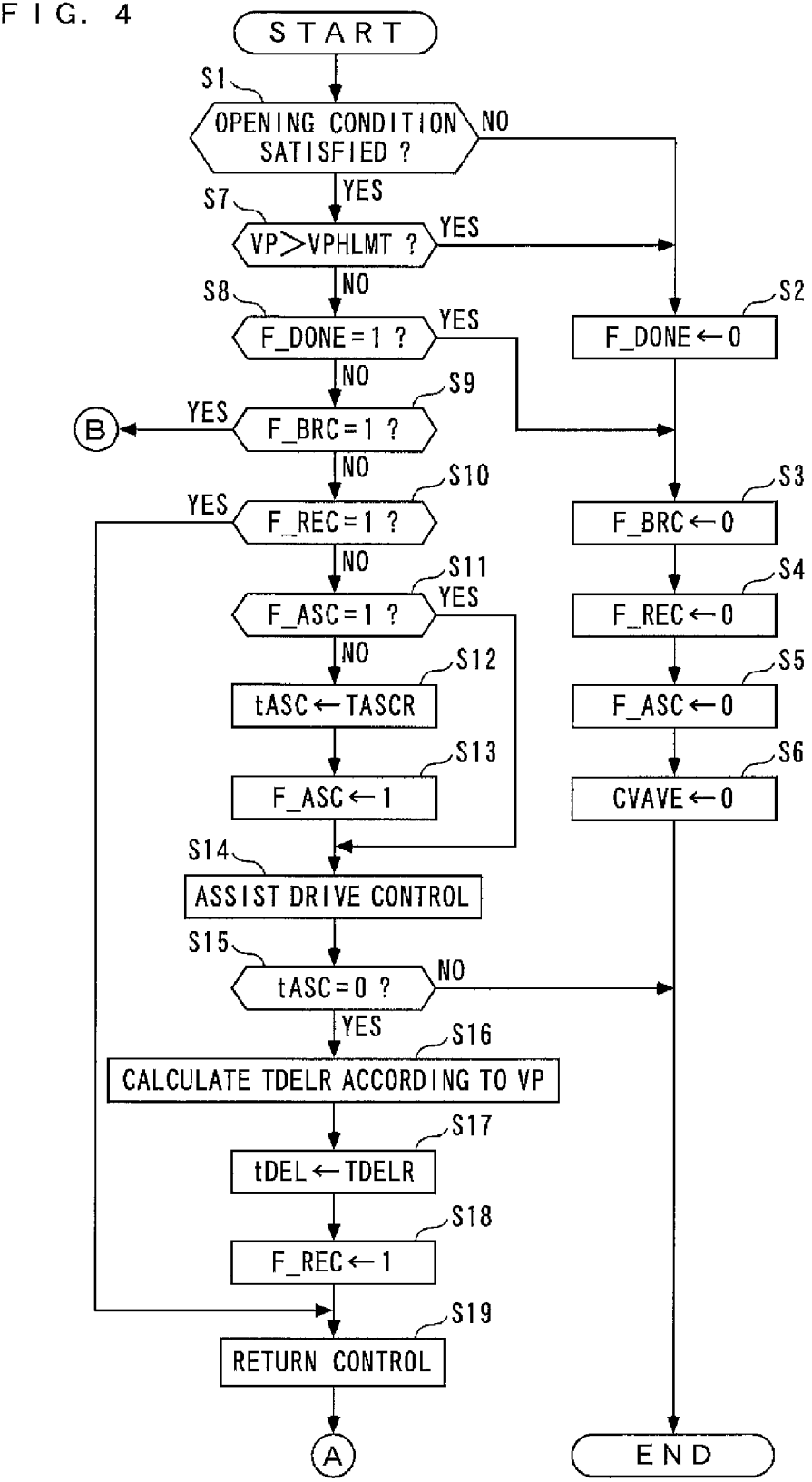
FIG. 4 is a flowchart of a failure determining process for determining failure of the shutter.
Figure 5:
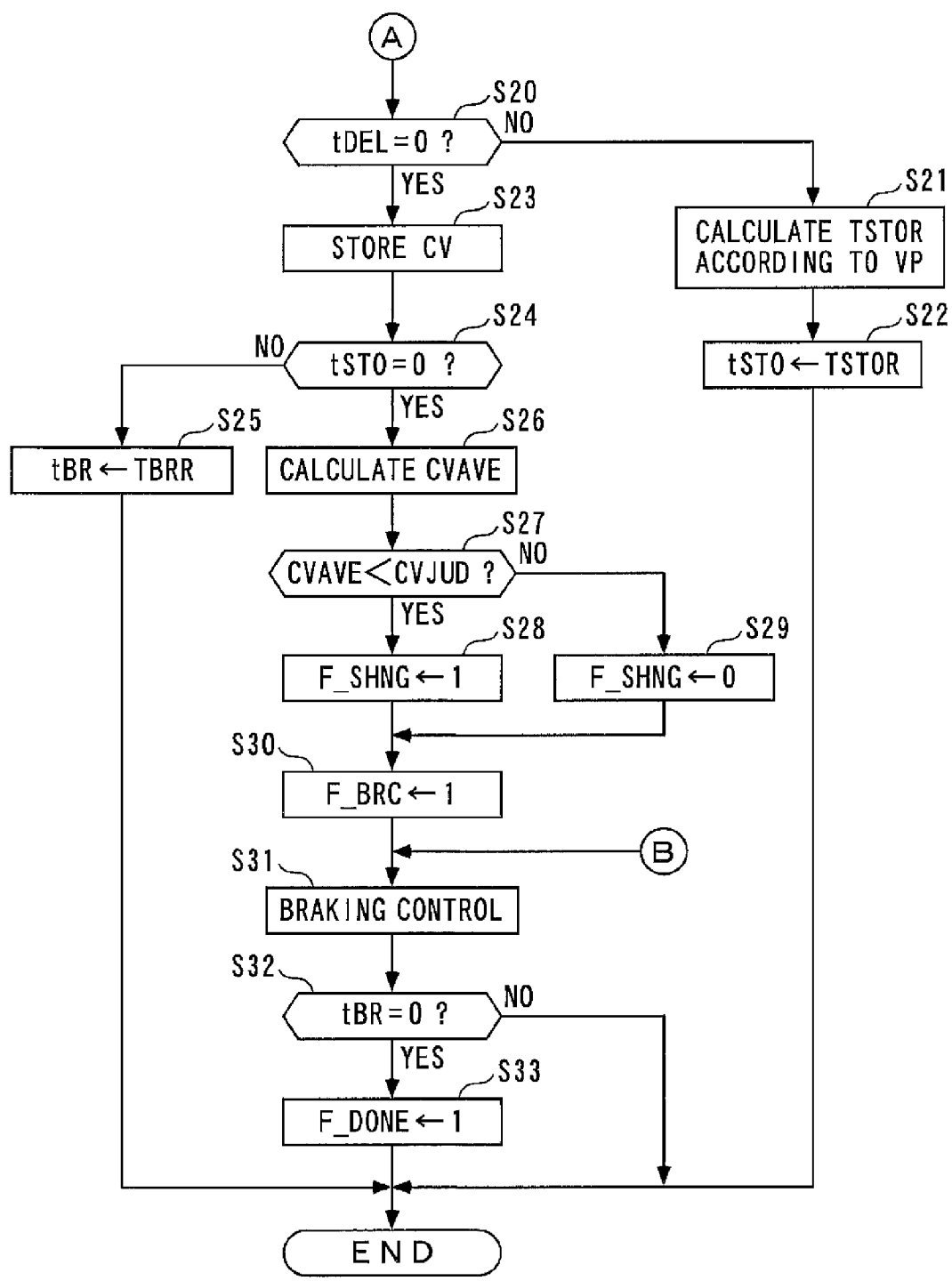
FIG. 5 is a continuation of FIG. 4.

Further, the failure determining unit 2c determines failure of the shutter 3 according to a failure determining process shown in FIGS. 4 and 5. This determination is executed on condition that the rotating machine 6 and the voltage sensor 41 are normal. Hereafter, a description will be given of the failure determining process with reference to FIGS. 4 and 5. The present process is repeatedly executed at predetermined intervals (e.g. 10 msec).

First, in a step 1 (shown as S1 in abbreviated form in FIGS. 4 and 5; the following steps are also shown in abbreviated form) in FIG. 4, it is determined whether or not the above-mentioned opening condition of the shutter 3 is satisfied. If the answer to this question is negative (NO), in steps 2, 3, 4 and 5, a determination operation completion flag F_DONE, a braking control flag F_BRC, a return control flag F_REC, and an assist drive control flag F_ASC, referred to hereinafter, are initialized to 0, respectively. Then, an induced voltage average value CVAVE is reset to 0 (step 6), followed by terminating the present process.

On the other hand, if the answer to the question of the step 1 is affirmative (YES), i.e. if the opening condition is satisfied, it is determined whether or not the detected vehicle speed VP is higher than a predetermined upper limit value VPHLMT (step 7). If the answer to this question is affirmative (YES), i.e. if the detected vehicle speed VP is very high, it is impossible to properly determine failure of the shutter 3 due to the influence of wind pressure caused by traveling wind acting on the shutter 3, and hence the step 2 et seq. are executed, followed by terminating the present process without performing failure determination.

On the other hand, if the answer to the question of the step 7 is negative (NO), in steps 8, 9, 10, and 11, it is determined whether or not the determination operation completion flag F_DONE, the braking control flag F_BRC, the return control flag F_REC, and the assist drive control flag F_ASC are equal to 1, respectively. If all of the answers to the questions of the steps 8 to 11 are negative (NO), a timer value tASC of an assist drive control timer of a countdown type is set to a predetermined time TASCR (step 12).

Then, in order to execute the assist drive control, the assist drive control flag F_ASC is set to 1 (step 13), and then the assist drive control is executed (step 14). During execution of the assist drive control, electric power is supplied to the rotating machine 6, whereby the rotating machine 6 is controlled such that the shutter 3 is moved toward the open position.

Further, after execution of the step 13, the answer to the question of the step 11 becomes affirmative (YES), and in that case, the process skips over the steps 12 and 13 to the step 14, whereby the assist drive control is executed. Further, in a step 15 following the step 14, it is determined whether or not the timer value tASC set in the step 12 is equal to 0.

If the answer to the question of the step 15 is negative (NO), the present process is immediately terminated, whereas if the answer to this question is affirmative (YES), i.e. if tASC=0 holds, which means that the predetermined time TASCR has elapsed after the assist drive control is started, a standby time TDELR is calculated by searching a predetermined map (not shown) according to the vehicle speed VP (step 16). In this map, as the vehicle speed VP is higher, the standby time TDELR is set to a smaller value. The reason for this relationship will be described hereinafter.

Then, a timer value tDEL of a standby timer of a countdown type is set to the standby time TDELR calculated in the step 16 (step 17). Next, in order to execute the return control, the return control flag F_REC is set to 1 (step 18), and then the return control is executed (step 19). During execution of the return control, supply of electric power to the rotating machine 6 is stopped, whereby when the shutter 3 is not faulty due to being stuck but normal, the shutter 3 is urged by the return spring 5 to be moved toward the open position.

Further, after execution of the step 18, the answer to the question of the step 10 becomes affirmative (YES), and in this case, the process skips over the steps 11 to 18 to the step 19, whereby the return control is executed.

As mentioned above, when the opening condition is not satisfied (NO to the step 1), the shutter 3 is held in the closed position. From this state, when the opening condition is satisfied to make the answer to the question of the step 1 affirmative (YES), if the vehicle speed VP is not higher than the upper limit value VPHLMT (NO to the step 7), the assist drive control is accordingly started (step 14), and during execution of the assist drive control, the rotating machine 6 is controlled such that the shutter 3 is moved toward the open position. Further, insofar as the opening condition is satisfied, and the vehicle speed VP is not higher than the upper limit value VPHLMT, the assist drive control is executed until the predetermined time TASCR has elapsed after the assist drive control is started (until the answer to the question of the step 15 becomes affirmative (YES)), and when the predetermined time TASCR has elapsed, the return control is started (step 19).

The predetermined time TASCR is set to the shortest time required to change the frictional force acting on the shutter 3 held in the closed position because the opening condition is not satisfied till then, from a static frictional force to a dynamic frictional force, and is empirically set in advance according to the moment of inertia of the shutter 3, the urging force of the return spring 5, and so on.

Further, in a step 20 in FIG. 5 following the step 19, it is determined whether or not the timer value tDEL of the standby timer set in the step 17 is equal to 0. If the answer to this question is negative (NO), a storage time TSTOR is calculated by searching a predetermined map (not shown) according to the vehicle speed VP (step 21). In this map, as the vehicle speed VP is higher, the storage time TSTOR is set to a smaller value. The reason for this will be described hereinafter. Then, a timer value tSTO of a storage timer of a countdown type is set to the storage time TSTOR calculated in the step 21 (step 22), followed by terminating the present process.

On the other hand, if the answer to the question of the step 20 is affirmative (YES), i.e. if tDEL=0 holds, which means that a time longer than the standby time TDELR has elapsed after the return control is started, the rotating machine induced voltage CV detected at the time is stored (step 23). This causes the rotating machine induced voltage CV to be sequentially stored in a plurality of buffers (not shown) included in the RAM.

Then, it is determined whether or not the timer value tSTO of the storage timer set in the step 22 is equal to 0 (step 24). If the answer to this question is negative (NO), a timer value tBR of a braking control timer of a countdown type is set to a predetermined time TBRR (step 25), followed by terminating the present process. On the other hand, if the answer to the question of the step 24 is affirmative (YES), i.e. if tSTO=0 holds, which means that the storage time TSTOR has elapsed after the operation of storing the rotating machine induced voltage CV by the step 23 is started, the induced voltage average value CVAVE as an average value of a plurality of stored values of the rotating machine induced voltage CV is calculated (step 26).

As described above, during execution of the return control, when the standby time TDELR has elapsed after the return control is started (YES to the step 20), the detected rotating machine induced voltage CV is sequentially stored in the plurality of buffers whenever the present process is executed (step 23). Further, the operation of storing the rotating machine induced voltage CV is carried out until the storage time TSTOR has elapsed after the storage operation is started. Then, when the storage time TSTOR has elapsed (YES to the step 24), the average value of the plurality of stored values of the rotating machine induced voltages CV is calculated as the induced voltage average value CVAVE (step 26).

Further, as is clear from FIG. 1, wind pressure caused by traveling wind of the vehicle V acts to move the shutter 3 toward the open position. To cope with this, as mentioned above, as the vehicle speed VP is higher, i.e. as the wind pressure caused by traveling wind is higher, the standby time TDELR and the storage time TSTOR are both set to a shorter time (steps 16 and 21). Therefore, it is possible to complete calculation of the induced voltage average value CVAVE according to the level of wind pressure caused by traveling wind before the shutter 3 reaches the open position or its vicinity.

Further, in a step 27 following the step 26, it is determined whether or not the calculated induced voltage average value CVAVE is smaller than a predetermined threshold CVJUD. The threshold CVJUD is set to a value of the rotating machine induced voltage CV generated when the rotating machine 6 is rotated by an external force at a very low predetermined rotational speed (e.g. 5 rpm).

If the answer to the question of the step 27 is affirmative (YES), i.e. the induced voltage average value CVAVE is very small, the shutter 3 is hardly moved due to being stuck, whereby it is considered that motive power is hardly transmitted from the shutter 3 to the rotating machine 6, so that it is determined that the shutter 3 is faulty. Further, to indicate this fact, a failure flag F_SHNG is set to 1 (step 28). On the other hand, if the answer to the question of the step 27 is negative (NO), it is determined that the shutter 3 is normal, and to indicate this fact, the failure flag F_SHNG is set to 0 (step 29).

Further, in a step 30 following the step 29, in order to execute the braking control, the braking control flag F_BRC is set to 1, and then in a step 31, the braking control is executed. During execution of the braking control, electric power is supplied to the rotating machine 6, and the above-mentioned switching elements are duty-controlled such that the rotating shaft 6a is rotated at a predetermined rotational speed. The predetermined rotational speed is set in the following manner: When the shutter 3 is normal, the rotational speed of the rotating machine 6 is empirically determined which is rotated by motive power transmitted from the shutter 3 moved by urging of the return spring 5, and the predetermined rotational speed is set to a value lower than the thus determined rotational speed. This causes, when the shutter 3 is normal, the brake force to act on the shutter 3 from the rotating machine 6.

Further, after execution of the step 30, the answer to the question of the step 9 becomes affirmative (YES), and in this case, the process skips over the steps 10 to 30 to the step 31, whereby the braking control is executed.

Further, in a step 32 following the step 31, it is determined whether or not the timer value tBR of the braking control timer set in the step 25 is equal to 0. If the answer to this question is negative (NO), the present process is immediately terminated, whereas if the answer to this question is affirmative (YES), i.e. if tBR=0 holds, which means that the predetermined time TBRR has elapsed after the braking control is started, it is judged that the braking operation for the failure determination, including determination of failure of the shutter 3, has been completed, and to indicate this fact, the determination operation completion flag F_DONE is set to 1 (step 33), followed by terminating the present process.

Further, after execution of the step 33, the answer to the question of the step 8 becomes affirmative (YES), and in that case, the step 3 et seq. are executed. From the above, a sequence of the operations in the steps 9 to 33, i.e. the assist drive control, the return control, the failure determination of the shutter 3, and the braking control are carried out once whenever the opening condition is satisfied.

Figure 6:
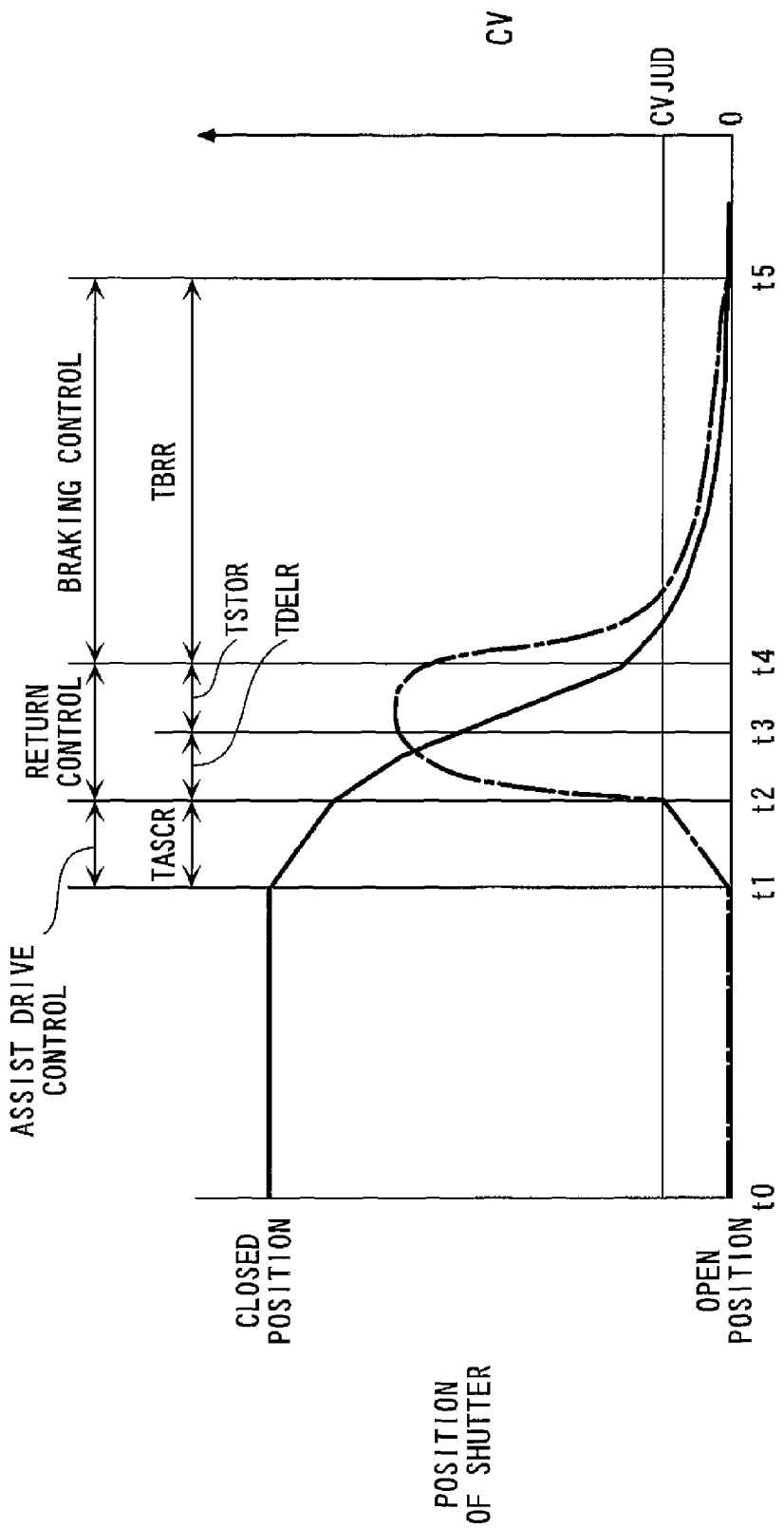
FIG. 6 is a timing diagram showing an example of operations of the shutter performed according to the failure determining process in FIGS. 4 and 5 in a case where the shutter is normal.

Further, FIG. 6 illustrates the example of the above-described operation of the failure determining process in the case where the shutter 3 is normal. In FIG. 6, a solid line indicates the position of the shutter 3, and a dashed-dotted line indicates the rotating machine induced voltage CV, respectively. In the state where the shutter 3 is held in the closed position because the opening condition is not satisfied (from a time point t0), the rotating machine 6 is not rotated, and hence the rotating machine induced voltage CV remains equal to 0. Then, when the opening condition is satisfied (time point t1: YES to the step 1), the assist drive control is executed (step 14). As a result, the shutter 3 is driven by the rotating machine 6 toward the open position. The assist drive control is executed over the predetermined time TASCR.

Further, since the shutter 3 has been held in the closed position before starting the assist drive control, the shutter 3 is moved toward the open position at a relatively low speed by inertia during execution of the assist drive control. Further, the motive power of the shutter 3 is transmitted to the rotating shaft 6a of the rotating machine 6, whereby the rotating shaft 6a is rotated, and the rotational speed of the rotating machine 6 increases from the state of being equal to 0 at a relatively small slope. In this case, since the rotating machine induced voltage CV is proportional to the rotational speed of the rotating machine 6, similarly to the rotational speed of the rotating machine 6, the rotating machine induced voltage CV increases from the state of being equal to 0 at a relatively small slope.

Then, when the predetermined time TASCR has elapsed after the assist drive control is started (time point t2, YES to the step 15), the return control is executed (step 19). As a result, the supply of electric power to the rotating machine 6 is stopped, whereby the shutter 3 is further moved toward the open position by urging of the return spring 5. In this case, the shutter 3 is moved toward the open position by inertia at a speed relatively higher than that in the assist drive control. Further, this causes the rotating machine 6 to be rotated at a higher rotational speed, whereby the rotating machine induced voltage CV increases at a larger slope.

Then, when the standby time TDELR has elapsed after the return control is started (time point t3, YES to the step 20), the rotating machine induced voltage CV is stored from a time point at which the standby time TDELR has elapsed until the storage time TSTOR elapses (step 23). Then, when the storage time TSTOR has elapsed (time point t4, YES to the step 24), failure of the shutter 3 is determined based on a result of comparison of the induced voltage average value CVAVE as an average value of a plurality of stored values of the rotating machine induced voltages CV with the threshold CVJUD (steps 27 to 29), and the braking control is executed (step 31).

In this case, when the return control is being executed and the rotating machine induced voltage CV is being stored, the rotating machine induced voltage CV largely exceeds the threshold CVJUD, so that the induced voltage average value CVAVE also largely exceeds the threshold CVJUD (NO to the step 27). As a result, it is determined that the shutter 3 is normal (step 29).

On the other hand, when the shutter 3 is stuck and hence is faulty, the motive power is not transmitted from the shutter 3 to the rotating shaft 6a during execution of the return control, and hence the rotational speed of the rotating machine 6 remains equal to 0, and the rotating machine induced voltage CV also remains equal to 0. This makes the induced voltage average value CVAVE lower than the threshold CVJUD, and as a result, it is determined that the shutter 3 is faulty (step 28).

Further, in this example of operation, during execution of the return control, the rotating machine induced voltage CV becomes largest immediately after the standby time TDELR has elapsed, and then slightly decreases. This is because as the shutter 3 is moved close to the open position, the extension of the return spring 5 is reduced, causing reduction of the urging force of the return spring 5, and as a result the moving speed of the shutter 3, i.e. the rotational speed of the rotating machine 6 is reduced.

Further, during execution of the braking control, the braking force acts on the shutter 3 from the rotating machine 6, whereby the speed of the shutter 3 moving toward the open position is largely reduced. In accordance with this, the rotational speed of the rotating machine 6 is largely reduced, whereby the rotating machine induced voltage CV largely drops. Then, when the predetermined time TBRR has elapsed after the braking control is started (time point t5: YES to the step 32), the braking control is terminated (step 33, YES to the step 8), and the shutter 3 is held in the open position by urging of the return spring 5.

Further, FIG. 7 illustrates a comparative example of FIG. 6, and more specifically, illustrates a relationship between the position of the shutter 3 and the rotating machine induced voltage CV in the case where the assist drive control and the return control are executed when the vehicle speed VP is higher than the upper limit value VPHLMT. As mentioned hereinabove, the wind pressure caused by traveling wind of the vehicle V acts to move the shutter 3 toward the open position. For this reason, during execution of the return control, the vehicle speed VP is very high, so that the wind pressure caused by traveling wind of the vehicle V is very high, so that the shutter 3 is rapidly moved toward the open position, and then reaches the open position immediately after the return control is started. From the above, it is impossible to properly determine failure of the shutter 3 based on the rotating machine induced voltage CV, and hence if the vehicle speed VP is higher than the upper limit value VPHLMT, the failure determination is inhibited in the step 7.

Further, a relationship between various elements in the embodiment and those in the invention described in appended claims (hereinafter referred to as the "present invention") is as follows: the return spring 5 and the upper stopper 19 in the embodiment correspond to urging means and a stopper in the present invention, respectively. Further, the voltage sensor 41, the ECU 2, and the induced voltage-detecting unit 2b in the embodiment correspond to induced voltage-detecting means in the present invention, the ECU 2 and the failure determining unit 2c in the embodiment correspond to control means, failure-determining means, and standby time-setting means in the present invention, and the vehicle speed sensor 43 in the embodiment corresponds to vehicle speed-detecting means in the present invention.

As described above, according to the present embodiment, the shutter 3 provided in the front part of the vehicle V is opened and closed by being driven by the rotating machine 6, and is urged by the return spring 5 such that it returns to the open position. Further, to return the shutter 3 to the open position by urging the same using the return spring 5, the return control is executed to stop the supply of electric power to the rotating machine 6, and then failure of the shutter 3 is determined based on the rotating machine induced voltage CV detected during execution of the return control. Therefore, it is possible to properly carry out the failure determination. In this case, the rotating machine induced voltage CV is simply detected using e.g. the voltage sensor 41, which is usually used for controlling the rotating machine 6, and a dedicated sensor for directly detecting the position of the shutter 3 is not used, which makes it possible to simplify the unit and reduce the costs.

Further, the failure determination of the shutter 3 is carried out based on the result of comparison of the induced voltage average value CVAVE as an average value of a plurality of values of the rotating machine induced voltages CV with the threshold CVJUD. This makes it possible to more properly carry out the failure determination while reducing the influence of temporary noise which can be contained in the detection signal from the voltage sensor 41. Further, during execution of the return control, when the shutter 3 is normal, the rotating machine induced voltage CV is generated by motive power transmitted from the shutter 3 which is moved by urging of the return spring 5 to the rotating machine 6 as described above. On the other hand, when the shutter 3 is faulty and is stuck, motive power is hardly transmitted from the shutter 3 to the rotating machine 6, so that the rotating machine induced voltage CV is hardly generated. From the above, it is possible to easily set the threshold CVJUD to be compared with the induced voltage average value CVAVE for use in determining failure of the shutter 3. For the same reason, even when the voltage sensor 41 which is relatively low in the detection accuracy is used, it is possible to carry out the failure determination without any problem.

Further, when executing the return control in the case where the shutter 3 is held in the closed position, the rotating machine 6 is controlled to drive the shutter 3 toward the open position by executing the assist drive control, and hence it is possible to rapidly change the frictional force acting on the shutter 3 from the static frictional force to the dynamic frictional force. Further, the return control is started after the assist drive control has been executed over the predetermined time TASCR, so that it is possible to carry out the return control in the state where the frictional force acting on the shutter 3 has been completely changed to dynamic frictional force. Therefore, it is possible to use the rotating machine induced voltage CV detected when the motive power transmitted from the shutter 3 to the rotational machine 6 is stable, and hence it is possible to further properly carry out this determination. For the same reason, it is possible to more easily set the threshold CVJUD.

Further, the assist drive control is executed only for the predetermined time TASCR before starting the return control, which makes it possible to positively prevent the shutter 3 from reaching the open position before determining failure, due to the assist drive control.

Further, the rotating machine induced voltage CV detected after the lapse of the standby time TDELR after the return control is started is used for the failure determination. Therefore, the rotating machine induced voltage CV which is generated in the state where the rotational speed of the rotating machine 6 is sufficiently increased by the shutter 3 being driven using the return spring 5 to a certain degree can be used for the failure determination, and hence it is possible to further properly carry out this determination. In this case, since the standby time TDELR is set according to the vehicle speed VP having a close correlation with the wind pressure caused by traveling wind, it is possible to further properly determine failure of the shutter 3.

Further, the failure determination is stopped when the vehicle speed VP is higher than the upper limit value VPHLMT, and is executed when the vehicle speed VP is not higher than the upper limit value VPHLMT. Therefore, it is possible to carry out the failure determination only in the condition suitable for this determination.

Further, the shutter 3 is brought into abutment with the upper stopper 19, whereby the shutter is prevented from moving beyond the open position. Further, when the failure determination is completed, the return control is terminated and the braking control is executed, whereby the rotating machine 6 is controlled to brake the shutter 3 being moved toward the open position by urging of the return spring 5. This makes it possible to reduce the speed of movement of the shutter 3, which makes it possible to reduce the hitting sound and impact force generated by hard abutment of the shutter 3 with the upper stopper 19, and therefore, it is possible to prevent the shutter 3 and the stopper 19 from being deformed. Further, since the braking control is carried out after the failure determination using the rotating machine induced voltage CV is completed, it is possible to perform both of the proper failure determination and avoidance of deformation of the shutter 3 etc.

Although in the embodiment, the braking control is carried out both in the cases when the shutter 3 is normal, and is faulty, this is not limitative, but when the shutter 3 is stuck and hence faulty, the shutter 3 is hardly moved toward the open position by urging of the return spring 5, so that it is not necessary to perform the braking control. Therefore, the braking control may be carried out only when the shutter 3 is determined to be normal.

Further, although in the embodiment, the failure determination is stopped when the vehicle speed VP is higher than the upper limit value VPHLMT, in place of this, or in addition to this, when at least one of the standby time TDELR and the storage time TSTOR both calculated according to the vehicle speed VP is shorter than a predetermined time, the failure determination may be stopped.

Note that the present invention is by no means limited to the embodiment described above, but it can be practiced in various forms. For example, although in the embodiment, the shutter 3 is a normally-open type, i.e. a type which is urged to the open position by the return spring 5, the shutter 3 may be a normally-closed type, i.e. a type which is urged to the closed position by the return spring 5. In this case, similarly to the embodiment, when the wind pressure caused by traveling wind of the vehicle acts to move the shutter toward the open position, as the wind pressure is higher, the shutter is less liable to be moved toward the closed position. Therefore, differently from the embodiment, as the vehicle speed VP is higher, both of the standby time TDELR and the storage time TSTOR are set to longer time periods. Further, although in the embodiment, the shutter 3 is configured to be moved toward the open position by the wind pressure caused by traveling wind, the shutter 3 may be configured to be moved toward the closed position.

Further, although in the embodiment, the shutter of a type which is held in the open position or the closed position is used as the shutter 3, the shutter of a type the position (opening) of which is continuously changed may be used. In this case, similarly to the embodiment, the failure determination may be performed when the shutter held in the closed position is driven to the open position, or differently from the embodiment, the failure determination may be performed when the shutter positioned in a predetermined position closer to the open position than the closed position is driven to the open position.

Further, although in the embodiment, the rotating machine 6 is a 3-phase brushless DC motor, it is obvious that the number of phases is not limited to 3, and for example, the rotating machine 6 may be any other suitable rotating machine having functions described in the appended claims, such as an AC motor. Further, although in the embodiment, the return spring 5 is an extension spring, the return spring 5 may be any other suitable urging means capable of urging the shutter 3 to return, such as a compression spring, a spiral spring, or a flat spring.

Further, although in the embodiment, the induced voltage average value CVAVE is used for the failure determination, a largest value of a plurality of stored values of the rotating machine induced voltages CV may be used, or a single value of the rotating machine induced voltage CV detected immediately after the standby time TDELR has elapsed may be used. Further, although in the embodiment, the failure determination is performed whenever the opening condition is satisfied, the failure determination may be performed whenever a relatively long predetermined time elapses, or may be performed only once during the operation of the engine. Further, although in the embodiment, the failure determination is performed, through satisfaction of the opening condition, by making use of a situation in which the shutter 3 is driven to the open position, the failure determination may be forcibly performed when the opening condition is not satisfied.

Further, although in the embodiment, the present invention is applied to the shutter unit 1 for adjusting an amount of outside air introduced into the condenser C etc., this is not limitative, but the present invention can also be applied to any other suitable shutter units provided in the front part of the vehicle V, for adjusting an amount of outside air introduced into the front part.

It is further understood by those skilled in the art that the foregoing are preferred embodiments of the invention, and that various changes and modifications may be made without departing from the spirit and scope thereof.

What is claimed is:

1. A shutter unit for a vehicle, comprising:
    a shutter that is provided in a front part of the vehicle, and is opened and closed in order to adjust an amount of outside air introduced into the front part;
    an urging mechanism engaged with said shutter and applying an urging force to said shutter to return said shutter to a predetermined initial position;
    a rotating machine configured to convert input motive power to electrical power, and to convert input electrical power to motive power, by electromagnetic induction action, said rotating machine engaged with said shutter and configured to drive said shutter by the motive power obtained by conversion of said input electrical power to motive power, and configured to generate a rotating machine induced voltage, which is an induced voltage of said rotating machine, by conversion of said input motive power to electrical power, said input motive power generated by movement of said shutter by said urging mechanism;
    an induced voltage-detecting unit configured to detect the rotating machine induced voltage;
    a control unit configured to execute return control for stopping supply of electric power to said rotating machine in order to cause said shutter to return to the initial position by the urging force applied to said shutter by said urging mechanism; and
    a failure-determining unit configured to determine failure of said shutter based on the rotating machine induced voltage detected during execution of the return control by said control unit,
    wherein said urging mechanism is provided separately from said rotating machine.

2. The shutter unit as claimed in claim 1, wherein in executing the return control from a state where said shutter is held in a predetermined position different from the initial position by being driven by said rotating machine, said control unit is configured to start the return control after executing assist drive control for controlling said rotating machine for a predetermined time such that said rotating machine drives said shutter toward the initial position.

3. The shutter unit as claimed in claim 1, wherein said failure-determining unit is configured to use the rotating machine induced voltage detected after a predetermined standby time has elapsed after starting of the return control, for determination of failure of said shutter.

4. The shutter unit as claimed in claim 3, further comprising:
    a vehicle speed sensor configured to detect a speed of the vehicle, and
    a standby time-setting unit configured to set the predetermined standby time based on a predetermined function which uses the detected vehicle speed as a variable.

5. The shutter unit as claimed in claim 1, further comprising a stopper with which said shutter is brought into abutment, for thereby restricting movement of said shutter beyond the initial position, and
    wherein said control unit is configured to terminate the return control when the determination of failure of said shutter by said failure-determining unit is completed, and to control said rotating machine such that said rotating machine drives said shutter so as to slow movement of said shutter toward the initial position when said shutter is moved toward the initial position by the urging force applied to said shutter by said urging mechanism.

6. The shutter unit as claimed in claim 1, wherein said urging mechanism includes a spring which applies the urging force to said shutter to return said shutter to the predetermined initial position.

7. The shutter unit as claimed in claim 6, wherein the urging force applied to said shutter by said urging mechanism is only supplied by said spring.

8. The shutter unit as claimed in claim 6, wherein said spring is a coil spring.

9. The shutter unit as claimed in claim 6, wherein said failure-determining unit is configured to determine failure of said shutter unit when the rotating machine induced voltage detected by said induced voltage-detecting unit during execution of the return control by said control unit is less than a predetermined threshold value.

10. The shutter unit as claimed in claim 1, wherein said failure-determining unit is configured to determine failure of said shutter unit when the rotating machine induced voltage detected by said induced voltage-detecting unit during execution of the return control by said control unit is less than a predetermined threshold value.

11. The shutter unit as claimed in claim 1, further comprising a vehicle speed sensor configured to detect a speed of the vehicle,
    wherein said failure-determining unit is configured to stop determination of failure of said shutter when the detected vehicle speed is higher than a predetermined upper limit value.

12. A shutter unit for a vehicle, comprising:
    a shutter that is provided in a front part of the vehicle, and is opened and closed in order to adjust an amount of outside air introduced into the front part;
    an urging mechanism engaged with the shutter and applying an urging force to said shutter to return said shutter to a predetermined initial position;
    a rotating machine configured to convert input motive power to electrical power, and to convert input electrical power to motive power, by electromagnetic induction action, said rotating machine engaged with said shutter and configured to drive said shutter by the motive power obtained by conversion of said input electrical power to motive power, and configured to generate a rotating machine induced voltage, which is an induced voltage of said rotating machine, by conversion of said input motive power to electrical power, said input motive power generated by movement of said shutter by said urging mechanism;

an induced voltage-detecting unit configured to detect the rotating machine induced voltage;

a control unit configured to execute return control for stopping supply of electric power to said rotating machine in order to cause said shutter to return to the initial position by the urging force applied to said shutter by said urging mechanism;

a failure-determining unit configured to determine failure of said shutter based on the rotating machine induced voltage detected during execution of the return control by said control unit; and a vehicle speed sensor configured to detect a speed of the vehicle, wherein said failure-determining unit is configured to stop determination of failure of said shutter when the detected vehicle speed is higher than a predetermined upper limit value.

13. The shutter unit as claimed in claim 12, wherein said urging mechanism includes a spring which applies the urging force to said shutter to return said shutter to the predetermined initial position.

14. The shutter unit as claimed in claim 13, wherein the urging force applied to said shutter by said urging mechanism is only supplied by said spring.

15. The shutter unit as claimed in claim 13, wherein said spring is a coil spring.

16. The shutter unit as claimed in claim 13, wherein said failure-determining unit is configured to determine failure of said shutter unit when the rotating machine induced voltage detected by said induced voltage-detecting unit during execution of the return control by said control unit is less than a predetermined threshold value.

17. The shutter unit as claimed in claim 12, wherein said failure-determining unit is configured to determine failure of said shutter unit when the rotating machine induced voltage detected by said induced voltage-detecting unit during execution of the return control by said control unit is less than a predetermined threshold value.

* * * * *